C. H. DUFFY.
SPARK PLUG.
APPLICATION FILED MAR. 13, 1920.
Reissued Apr. 27, 1920. 14,847.
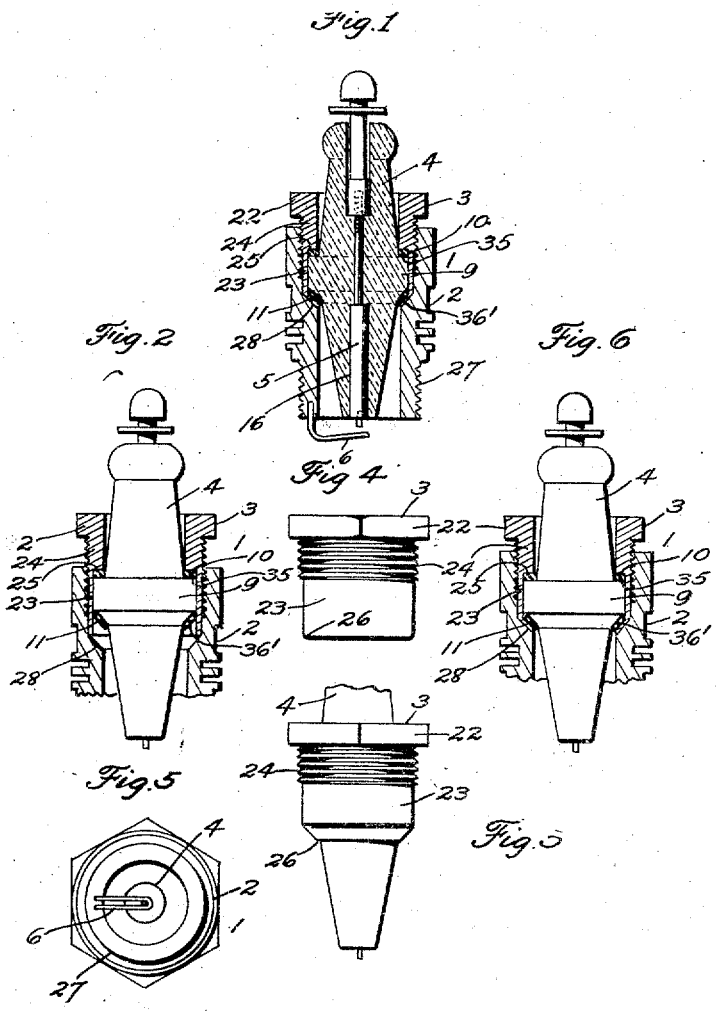
Inventor
Charles Hugh Duffy

UNITED STATES PATENT OFFICE.

CHARLES HUGH DUFFY, OF CHEVY CHASE, MARYLAND.

SPARK-PLUG.

14,847. Specification of Reissued Letters Patent. Reissued Apr. 27, 1920.

Original No. 1,260,884, dated March 26, 1918, Serial No. 183,549, filed July 30, 1917. Application for reissue filed March 13, 1920. Serial No. 365,643.

*To all whom it may concern:*

Be it known that I, CHARLES HUGH DUFFY, a citizen of the United States, residing at Chevy Chase, in the county of Montgomery and State of Maryland, have invented new and useful Improvements in Spark-Plugs, of which the following is a specification.

This invention relates to spark plugs for internal combustion engines, and has for its object to provide a device of this class which embodies improvements in the method, construction and arrangement for seating and maintaining the insulating core within the metal shell of the plug to prevent leakage of pressure.

The invention consists of the novel construction and arrangement of the core-holding gland, and in the method for effecting the retention of the core within the same, and of effecting a gas-tight union between the gland and the metal shell and between the gland and the core.

The invention further consists of the construction which provides for rotation of both the upper and the lower gaskets uniformly with the insulating core and gland, and in the method of assembling the parts whereby rotation of the upper and lower packing gaskets uniformly with the insulating core and gland is assured.

In spark plugs wherein the insulating core is seated upon a packing gasket, and in which a rotatable gland is employed to press a packing gasket upon the insulating core, and to press the insulating core upon the lower packing gasket, a rotating movement is imparted to the insulating core by the rotating gland, and the insulating core is thus caused to rotate on its lower packing gasket instead of being progressed or pressed straight into the gasket, while there also occurs a rotation of the gland on the upper packing gasket. This rotation of the insulating core on its lower packing gasket, cuts and tears the said gasket so that an absolute gas-tight joint is prevented. In order to cause a packing-gasket or gaskets, such as are employed in spark plugs, to properly function and provide gas-tight joints, there should be no relative rotation between the insulating core and the lower packing-gasket, nor between the gland and the upper packing-gasket, but the insulating core should be pressed straight into the gasket so that the gasket will conform to the unevenness and irregularities in the shoulders of the insulating core. Experience has shown that these gaskets are scratched, scarred, torn and their utility impaired by rotating the insulating core thereon, or by rotating the gland on and relatively to the upper packing-gasket.

Referring to the accompanying drawing:

Figure 1 is a vertical sectional view of a spark plug constructed in accordance with this invention.

Fig. 2 is a fragmentary sectional view illustrating the manner of assembling the gland and core in the shell.

Fig. 3, is an elevation of the gland and core after being assembled.

Fig. 4 is an elevation of the gland before entering the shell.

Fig. 5 is a bottom plan view of the shell, and

Fig. 6 is a vertical sectional view showing the shell, gland and core in an assembled position.

Like numerals of reference indicate the same parts throughout the several figures, in which:—

1 indicates the spark plug comprising the threaded metal shell 2, gland 3, insulating core 4, central electrode 5 and ground electrode 6.

The core 4 has an enlarged central ring 9 forming a flat shoulder 10 at its top and preferably a 45° shoulder 11 at its bottom, and is centrally apertured at 16 to receive the threaded central electrode 5.

Referring to the gland 3 it will be seen that the same is provided with a flatted portion 22, a depending thin tubular or thimble portion 23 integral with the gland and an intermediate threaded portion 24 for connection with the internally threaded shell 2, while internally of the gland 3 at the beginning of the thin tubular portion 23, is a shoulder 25, the edge of said tubular portion being preferably rounded at 26, the flatted portion 22, tubular portion 23, and threaded portion 24 being a unit.

The shell 2 is externally threaded at 27 for connection with a motor, and is provided intermediate its ends with a downwardly inclined annular shoulder 28, the shell being apertured to receive the core and gland 3 in the manner as shown in Fig. 1.

In assembling the plug, the core and central electrode are secured in proper position, and the core 4 is placed in the gland 3, a gasket 35 being preferably provided between the shoulder 10 of the core 4 and the shoulder 25 of the gland 3, the thin depending tubular portion 23 extending slightly beyond the inclined shoulder 11 of the core while a gasket 36′ is positioned on the shoulder 11 as shown in Fig. 2. When in this position, the gland 3 and core 4 are inserted in the shell 2, the operation being facilitated if the parts are held upside down. The gland 3 is threaded into the shell 2, so that the rounded edge 26 of the tubular extension 23 impinges on the inclined shoulder 28, as shown in Fig. 2. Further rotation of the gland 3 causes it to progress inwardly of the shell 2, and the rounded edge 26 of the gland 3 is gradually spun inwardly, as shown in Fig. 3, by the shoulder 28 until the entire end-portion of the thin tubular extension 23 is spun over and upon the gasket 36′ by the inclined shoulder 28 and between said gasket and the inclined shoulder 28 of the shell 2. As this spinning operation is being effected and the inward progress of the core 4 is being retarded by the turning under of the tubular portion 23, the packing-gaskets 35 and 36′ are compressed. As the edge portion of the tubular extension 23 is spun under the gasket 36′ on the shoulder 11 of the core, as it is being rotated on the inclined shoulder 28 of the shell, said edge portion conforms to the said shoulder 28 and grinds a bearing thereon, in such manner that a gas-tight union is formed between the shoulder 28 and the spun edge portion of the tubular extension 23, while a gas-tight joint is simultaneously effected between the core 4 and the gland 3 at the packing-gaskets 35 and 36′. This method of spinning and seating the gland directly on the inclined shoulder 28 of the shell 2 presents the advantage that an absolute conformation of the spun portion of the gland with the shoulder 28 is produced.

It will be seen from the foregoing that during the seating of the spun portion of the gland on the shoulder 28 in the shell, the upper and lower packing gaskets 35 and 36′ are compressed between the shoulders 10 and 11 of the insulating core and the contiguous portions of the gland without any relative rotation of the parts. The result is that the shoulders 10 and 11 of the insulating core are sunk directly into the gaskets 35 and 36′, the slight irregularities of the said shoulders entering straight into the gaskets as distinguished from the cutting, scarring, tearing action which results from rotating the insulating core or the gland on or against the packing-gaskets.

What I claim as new and desire to secure by Letters Patent of the United States, is:

1. A spark plug comprising a metal shell threaded for connection with a motor, and having an internal bore and an internal shoulder, an insulating core and suitable electrodes, a gland for connection with said shell, a tubular portion on said gland and integral therewith and an internal shoulder therein, said tubular portion being adapted to receive said insulating core, the end of said tubular portion being adapted to engage the said shoulder in said shell to spin said end of said tubular portion under said insulating core and between the same and said shoulder in said shell, upon rotation of said gland in said shell.

2. A spark plug comprising a metal shell having a bore therein, and an internal shoulder, an insulating core having a central ring forming an upper and a lower shoulder, a gland for connection with said shell and having an internal shoulder and an integral tubular portion to receive said insulating core, the lower end of said tubular portion being adapted to engage said shoulder in said shell to spin the same under said ring and between the same and said shoulder in said shell, upon rotation of said gland in said shell.

3. A spark plug comprising a metal shell having a shoulder therein, an insulating core having a ring thereon, a gland having a shoulder therein and an integral tubular portion to receive said insulating core, said tubular portion being adapted to engage and rotate on said shoulder in said shell to spin said tubular portion under said ring and to grind a gas-tight joint between the spun tubular portion and the shoulder in said shell.

4. A spark plug comprising a metal shell having a shoulder therein, a gland for connection with said shell, an insulating core to be received by said gland, a tubular portion on and integral with said gland adapted to engage said shoulder in said shell and to rotate thereon to spin the tubular portion under said insulating core.

5. A spark plug comprising a shell, an insulating core and a gland provided with a tubular portion integral therewith adapted to receive said insulating core, means within said shell to be engaged by said tubular portion of said gland to spin the tubular portion around said insulating core upon the inward progression and rotation of said gland within said shell.

6. A spark plug comprising a shell having a shoulder therein, an insulating core having a ring thereon forming an upper and a lower shoulder, a gland for connection with said shell and provided with an internal shoulder and a tubular portion integral with the gland, said insulating core being adapted to be received by said gland, packing means between the shoulder in said gland and the upper shoulder on the insulating core, the said tubular portion on said gland being adapted to engage said shoulder in said shell and to rotate thereon to spin said tubular portion under the lower shoulder of said insulating core and to grind a gas-tight joint between the shoulder in said shell and the tubular portion of the gland.

7. The herein described method of seating an insulating core in a spark plug shell which consists in inserting the insulating core in a threaded gland or bushing, in threading the gland or bushing into a spark plug shell to rotate the gland or bushing against a shoulder in the spark plug shell to spin the said gland or bushing under the insulating core and between the same and the shoulder in the spark plug shell.

8. The herein described method of seating an insulating core in a spark plug shell, which consists in providing a spark plug shell with an internal shoulder and in providing a core-retaining gland with a thin tubular portion integral therewith, in inserting the insulating core within its retaining gland and in rotating the gland against the shoulder in the shell to spin the tubular portion of the gland between the insulating core and the shoulder in the spark plug shell.

9. The herein described method of seating an insulating core in a spark plug shell which consists in relatively rotating a threaded core retaining gland within and with relation to a spark plug shell to relatively progress the core retaining gland against a shoulder in the spark plug shell to spin the core retaining gland between the insulating core and the shoulder in the spark plug shell.

10. The herein described method of seating an insulating core in a spark plug shell, which consists in relatively progressing a threaded core-retaining gland inwardly of a spark plug shell and against a shoulder therein to distort the said threaded core-retaining gland and spin the gland between the insulating core and the spark plug shell.

11. The herein described method of retaining an insulating core within a spark plug gland, which consists in relatively progressing a threaded core-retaining gland inwardly of a shell and against a shoulder therein to distort the said threaded core retaining gland and spin the gland between the insulating core and the shoulder in the shell.

12. A spark plug including a metal shell threaded for connection with a motor and having an internal bore and an internal shoulder, an insulating core and suitable electrodes, a gland for connection with said shell, said gland including a tubular portion integral therewith, an internal shoulder, said tubular portion being adapted to receive said insulating core, said insulating core being provided with a shoulder adjacent the lower end of said tubular portion, a packing gasket on said shoulder on the insulating core, the said tubular portion of the gland having a spun portion over and upon said packing gasket, the whole arranged in such manner that upon rotation of the gland as in seating the spun portion thereof on the shoulder in the said shell, the said packing gasket and insulating core rotate together and uniformly with the said gland, and the packing gasket is compressed between the insulating core and the spun portion of the gland.

13. A spark plug including a metal shell having a bore therein and an internal shoulder, an insulating core having a central ring forming an upper and a lower shoulder, a gland for connection with said shell and having an internal shoulder and a tubular portion integral with the gland to receive said insulating core, and a packing gasket on the said lower shoulder of the central ring, the lower end of said tubular portion having a spun portion over and upon said packing gasket, whereby upon the seating of the gland and insulating core on the shoulder in the shell by the rotation of said gland in said shell, the said packing gasket and insulating core are rotated together and uniformly with the said gland, and the said gasket is compressed between the insulating core and the spun portion of the gland.

14. A spark plug including a metal shell having a shoulder therein, an insulating core having a ring thereon, a rotatable gland having a shoulder therein and a tubular portion to receive said insulating core, and a gasket under said ring, the tubular portion of said gland having a spun portion under and against said gasket and between the same and the said shoulder in the shell; whereby upon rotation of the said gland as in seating the spun portion thereof on the shoulder in the shell, the said gasket and insulating core are rotated uniformly with the said gland, and the said gasket is compressed between the insulating core and the spun portion of the gland.

15. A spark plug including a metal shell having a shoulder therein, a gland having threaded connection with said shell, an insulating core within said gland, said gland including a tubular portion integral therewith, and a packing gasket on said insulating core, the said tubular portion of the gland having a spun portion under and against said packing gasket and between the same and the said shoulder in the shell; whereby upon threading the said gland into the said shell and against the shoulder in the shell, the said gasket and insulating core are rotated uniformly with the said gland and the said gasket is compressed between the insulating core and the spun portion of the gland 16. A spark plug including a shell, an insulating core, a gland having threaded connection with the shell and receiving said insulating core, and a packing gasket on said insulating core, the said gland including a spun portion integral therewith, the said shell including means forming a seat for said spun portion, the said spun portion being disposed under and against said gasket and between the same and said means in said shell; whereby upon threading said gland in the shell to seat the said spun portion on the said means in the shell, the said gasket and insulating core are rotated together and uniformly with the said gland, and the gasket is compressed between the insulating core and the spun portion of the gland 17. A spark plug comprising a shell having a shoulder therein, an insulating core having a ring thereon forming an upper and a lower shoulder, a gland for threaded connection with said shell and provided with an internal shoulder and including a tubular portion to receive said insulating core, a packing gasket between the shoulder in the said gland and the upper shoulder on said insulating core, said gland including a spun portion under the lower shoulder of the insulating core and between the same and the shoulder in the shell, said spun portion being a part of and rotatable with the gland; whereby upon rotation of the gland and its spun portion to seat the spun portion on the shoulder in the shell, the said packing gasket is compressed between the shoulder in the gland and the upper shoulder on the insulating core to form a gas-tight union between the insulating core and the gland.

18. A spark plug including a metal shell threaded for connection with a motor and having an internal bore and an internal shoulder, an insulating core and suitable electrodes, a threaded gland for threaded connection with said shell, said gland including a tubular portion integral therewith and having an internal shoulder, a packing gasket on said shoulder, said insulating core being within said tubular portion and against said packing gasket, the said tubular portion including a spun portion under the insulating core and between same and the shoulder in the shell; whereby upon rotation of the gland as in seating the spun portion on the shoulder in the shell, the said packing gasket and insulating core are rotated together and uniformly with said gland, and the said gasket is compressed between the insulating core and the internal shoulder in the gland.

19. The herein described method of retaining an insulating core in a spark plug gland, consisting in inserting the insulating core in a threaded gland or bushing, in positioning a packing gasket on the insulating core and within the gland, and in threading the gland into a spark plug shell to seat the said gland or bushing on a shoulder in a spark plug shell, and to compress said packing gasket between the insulating core and that portion of the gland seated on the shoulder in the spark plug shell.

20. The herein described method of retaining an insulating core in a threaded spark plug gland, consisting in positioning a packing gasket in said threaded gland, in inserting the insulating core in said threaded gland and upon said packing gasket therein, and in threading said gland in a spark plug shell and upon a shoulder therein to seat said gland on said shoulder and to compress the gasket between the threaded gland and the insulating core.

21. The herein described method of retaining an insulating core in a threaded spark plug gland, which comprises positioning an insulating core and a packing gasket within said threaded gland, and in spinning and seating the gland on a shoulder in a spark plug shell to compress the said packing gasket between the spun portion of the threaded gland and the insulating core.

22. The herein described method of retaining an insulating core in a threaded gland having an internal shoulder and a thin tubular portion integral with the gland, including the inserting of an insulating core within the tubular portion of the gland, in positioning a packing gasket on the insulating core, and in seating the tubular portion of the gland on a shoulder in a spark plug shell to compress the packing gasket between the insulating core and the portion of the threaded gland seated on the shoulder in the spark plug shell.

23. A spark plug including an internally threaded shell, a gland threaded for connection with said shell and including a thin depending tubular extension integral with the gland, a shouldered insulating core within said gland, a packing gasket on the shoulder of the insulating core, said tubular extension including a spun portion over and against the said packing gasket for retaining the insulating core and packing gasket against relative rotation upon threading the gland into the said shell to seat the same 24. A spark plug including an internally threaded shell having an internal shoulder, a gland threaded for connection with said shell and including a thin tubular extension integral with the gland and an internal shoulder, an insulating core within said gland and having an upper and a lower shoulder, a packing gasket on the upper shoulder of the insulating core and against the shoulder in the gland, a packing gasket on the lower shoulder of the insulating core, the thin tubular extension including a spun portion over and against the packing gasket on the lower shoulder of the insulating core, the said gland and its spun portion retaining the insulating core and its upper and its lower packing gasket against relative rotation upon the seating of the spun portion of the gland on the shoulder in the shell.

In testimony whereof I affix my signature.

CHARLES HUGH DUFFY.